(12) United States Patent
Hama et al.

(10) Patent No.: US 8,481,204 B2
(45) Date of Patent: Jul. 9, 2013

(54) SOLID-STATE BATTERY

(75) Inventors: Shigenori Hama, Susono (JP); Shoji Yokoishi, Mishima (JP); Yukinari Kotani, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 572 days.

(21) Appl. No.: 12/663,553

(22) PCT Filed: Jul. 28, 2008

(86) PCT No.: PCT/IB2008/002570
§ 371 (c)(1),
(2), (4) Date: Dec. 8, 2009

(87) PCT Pub. No.: WO2009/016510
PCT Pub. Date: Feb. 5, 2009

(65) Prior Publication Data
US 2010/0178554 A1    Jul. 15, 2010

(30) Foreign Application Priority Data

Jul. 27, 2007 (JP) ................. 2007-195469

(51) Int. Cl.
*H01M 2/08* (2006.01)
*H01M 6/42* (2006.01)
(52) U.S. Cl.
USPC ......................................... 429/185; 429/152
(58) Field of Classification Search
USPC ......................................... 429/152, 174, 185
See application file for complete search history.

(56) References Cited

U.S. PATENT DOCUMENTS

| 4,430,396 | A | * | 2/1984 | Hayes, Jr. ............... 429/185 X |
| 4,448,860 | A | | 5/1984 | von Alpen et al. |
| 7,320,846 | B2 | | 1/2008 | Watanabe et al. |
| 2003/0054241 | A1 | | 3/2003 | Yamashita et al. |
| 2005/0089754 | A1 | * | 4/2005 | Lang ............................ 429/185 |
| 2005/0147877 | A1 | | 7/2005 | Tarnowski et al. |

FOREIGN PATENT DOCUMENTS

| CA | 2276185 A1 | 4/1999 |
| DE | 3324969 A1 | 1/1984 |
| JP | 06267593 A | 9/1994 |
| JP | 06275247 A | 9/1994 |
| JP | 08138635 | 5/1996 |
| JP | 08287889 A | 11/1996 |
| JP | 09-326264 A | 12/1997 |
| JP | 10074496 A | 3/1998 |
| JP | 11339800 | 12/1999 |
| JP | 2000100471 | 4/2000 |

(Continued)

OTHER PUBLICATIONS

Computer-generated translation of JP 6-275247 (Iwamoto et al.), from the Japanese Patent Office website (doc date Sep. 1994).*

*Primary Examiner* — Stephen J. Kalafut
(74) *Attorney, Agent, or Firm* — Gifford, Krass, Sprinkle, Anderson & Citkowski, P.C.

(57) ABSTRACT

A solid-state battery has a power generation element (5) having a cathode layer (1), a sulfide-based solid electrolyte membrane (2), an anode layer (3) that are stacked in this order; a battery case (6) in which the power generation element is disposed; and a flowable sealant (7) provided in the battery case and being non-reactive with the sulfide-based solid electrolyte membrane, the power generation element being soaked in the flowable sealant.

15 Claims, 6 Drawing Sheets

FOREIGN PATENT DOCUMENTS

| | | |
|---|---|---|
| JP | 2000100473 | 4/2000 |
| JP | 2000260411 | 9/2000 |
| JP | 2001-506055 T | 5/2001 |
| JP | 2003092092 | 3/2003 |
| JP | 2003346924 | 12/2003 |
| JP | 2005005163 | 1/2005 |
| JP | 2005019134 | 1/2005 |
| JP | 2005-302698 | 10/2005 |
| JP | 2006351326 | 12/2006 |
| JP | 2007080733 | 3/2007 |

* cited by examiner

SOLID-STATE BATTERY

CROSS-REFERENCE TO RELATED APPLICATIONS

This application is the U.S. national phase of PCT/IB2008/002570 filed Jul. 28, 2008, which claims priority of Japanese Patent Application No. JP 2007-195469 filed Jul. 27, 2007.

FIELD OF THE INVENTION

The invention relates to a solid-state battery that prevents cracks at sealed portions even when the volume of a power generation element changes upon power charge, power discharge, and so on, and thus minimizes degradation of a sulfide-based solid electrolyte membrane due to entrance of moisture to the power generation element.

BACKGROUND OF THE INVENTION

In recent years, with the rapid spread of various information devices and communication devices, such as personal computers, video cameras, and mobile phones, great emphasis has been put on developments of batteries as the power sources for such devices. In the automotive industries and other related industries, too, developments have been conducted for high-output and large-capacity batteries for electric vehicles and hybrid vehicles. Among such batteries under development, lithium batteries have been attracting much attention due to their high energy density.

In the lithium batteries presently available in market, an organic electrolyte solution containing a combustible organic solvent is used, and it requires various safety devices for preventing a temperature increase upon short-circuits and requires various improvements of the structure and materials for preventing short-circuits.

On the other hand, solid-state lithium batteries using solid electrolyte in place of liquid electrolyte do not contain any combustible organic solvent, and therefore the aforementioned safety devices and safety structures can be omitted or simplified, which is desirable in view of the production cost and the manufacturability. However, in a case where a sulfide-based solid electrolyte membrane is used as a solid electrolyte membrane, if the sulfide-based solid electrolyte membrane contacts the moisture in the air, sulfide hydrogen is produced and it causes significant deterioration of the performance of the sulfide-based solid electrolyte membrane.

In view of such problems, solid-state batteries have been proposed in which a power generation element constituted of a cathode, a sulfide-based solid electrolyte membrane, and an anode is sealed using sealant. As one of such solid-state batteries, a fully solid-state battery is described in Japanese Patent Application Publication No. 06-275274 (JP-A-06-275247) in which the power generation element is sealed by a high-temperature curing resin sealant. According to this solid-state battery, because the power generation element is protected by the sealant, the moisture in the air which causes degradation of the sulfide-based electrolyte membrane does not enter the power generation element, and therefore said degradation of the sulfide-based solid electrolyte membrane due to entrance of moisture into the power generation element does not occur. However, when Li ions move between the cathode and the anode upon power charge, power discharge, and so on, the volume of the power generation element changes (the power generation element expands or contracts), the portions sealed by the high-temperature curing resin may crack. In this case, the moisture in the air enters the power generation element via the crack and it causes degradation of the sulfide-based solid electrolyte membrane.

SUMMARY OF THE INVENTION

The invention provides solid-state batteries that prevent cracks at sealed portions even when the volume of a power generation element changes upon power charge, power discharge, and so on, and thus prevents degradation of the sulfide-based solid electrolyte membrane which may otherwise be caused by entrance of moisture into the power generation element.

An aspect of the invention relates to a solid-state battery having: (i) a power generation element having a cathode layer, a sulfide-based solid electrolyte membrane, an anode layer that are stacked in this order; (ii) a battery case in which the power generation element is disposed; and (iii) a flowable sealant provided in the battery case and being non-reactive with the sulfide-based solid electrolyte membrane, the power generation element being soaked in the flowable sealant.

According to the solid-state battery described above, because the power generation element is sealed by being soaked in the flowable sealant, moisture which degrades the sulfide-based solid electrolyte membrane does not enter the power generation element and therefore said possible degradation of the sulfide-based solid electrolyte membrane can be prevented. The solid-state battery has the flowable sealant, therefore, the solid-state battery is flexible or deformable enough to tolerate a change in the volume of the power generation element, which occurs when the power generation element is being charged with electric power or when electric power is being discharged from the power generation element, and so on.

According to the solid-state battery described above, the flowable sealant may be a hydrophobic liquid. In this case, it is possible to prevent the moisture in the air from contacting the sulfide-based solid electrolyte membrane more reliably.

According to the solid-state battery described above, further, the hydrophobic liquid may be liquid paraffin because liquid paraffin is highly hydrophobic and does not react directly with the sulfide-based solid electrolyte membrane.

According to the solid-state battery described above, further, the flowable sealant may be a dispersion.

According to the solid-state battery described above, further, the flowable sealant may be insulative.

According to the solid-state battery described above, further, the power generation element may be provided in plurality, and the power generation elements may be stacked with intermediate power collectors interposed in-between. This structure increases the usability of the solid-state battery.

According to the solid-state battery described above, further, the battery case may be an open battery case. This structure suppresses a sharp change in the internal pressure of the solid-state battery when the volume the power generation element changes upon power charge, power discharge, and so on.

According to the solid-state battery described above, further, the battery case may be a sealed battery case. In this case, the moisture in the air does not enter the solid-state battery.

The solid-state battery described above may further have an internal pressure adjustment portion that adjusts a change in the internal pressure of the solid-state battery that occurs in response to a change in the volume of the power generation element.

The solid-state battery described above may further have an agitation portion for agitating the flowable sealant. According to this structure, for example, when the power generation element is heated or cooled via the flowable sealant, the temperature of the power generation element can be increased or decreased uniformly.

According to the above-described solid-state battery with the agitation portion, the agitation portion may be adapted to circulate the flowable sealant through an external passage connected to the battery case. In this case, the flowable sealant can be agitated more efficiently.

The solid-state battery described above may further have a temperature adjustment portion for heating or cooling the flowable sealant. By adjusting the temperature of the power generation element via the flowable sealant, the thermal condition for power charge, power discharge, and so on, of the solid-state battery can be easily optimized and thus the power generation efficiency can be improved.

According to the solid-state battery described above, further, the power generation element may have a guide portion that is provided at the bottom side of the battery case so as to release bubbles. In this case, the guide portion prevents bubbles from remaining near the bottom face of the battery case when the power generation element is soaked in the flowable sealant.

The solid-state battery described above may further have a dehydration portion for reducing the amount of water contained in the flowable sealant.

Thus, the solid-state batteries according to the invention prevent cracks at the sealed portion even if the volume of the power generation element changes upon power charge, power discharge, and so on, and thus minimizes or prevents degradation of the sulfide-based solid electrolyte membrane which may otherwise be caused by entrance of moisture into the power generation element.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, solid-state batteries according to the invention will be described in detail with reference to the accompanying drawings.

A solid-state battery according to the invention incorporates: a power generation element constituted of a cathode layer, a sulfide-based solid electrolyte membrane, and an anode layer that are stacked in this order, a battery case in which the power generation element is disposed, and a flowable sealant in which the power generation element is soaked and which is non-reactive with the sulfide-based solid electrolyte membrane.

According to the invention, because the power generation is sealed by being soaked in the flowable sealant, moisture do not enter the power generation element, and it is therefore possible to prevent degradation of the sulfide-based solid electrolyte membrane, which may otherwise be caused if moisture enters the power generation element. According to the solid-state battery of the invention has the flowable sealant, therefore, the solid-state battery is flexible or deformable enough to tolerate a change in the volume of the power generation element, which occurs when the power generation element is being charged with electric power or when electric power is being discharged from the power generation element, and so on. According to the above described solid-state battery of the invention, further, because the sealant for sealing the power generation element is flowable, any gap between the power generation element and the battery case can be filled up with the sealant, and therefore the sealing performance is excellent.

According to the above-described solid-state battery of the invention, further, because the sealant for sealing the power generation element is flowable, the sealant can be agitated and circulated. As such, as will be described in detail later, in a case where the power generation is heated or cooled via the flowable sealant, the temperature of the power generation can be evenly increased or reduced, which improves the efficiency of the power generation of the power generation element. Meanwhile, as is known in the art, high-temperature curing resin sealants have the following drawbacks. First, they are not easy to be processed or formed into a desired shape for sealing. Second, they essentially require a heat-curing process and thus are not easy to be handled. Third, they essentially require a high-temperature treatment and therefore need to be made of a heat-resistant material. On the other hand, in the solid-state battery of the invention, because the flowable sealant is used, such drawbacks of high-temperature curing resin sealants do not exist.

Figure 1:
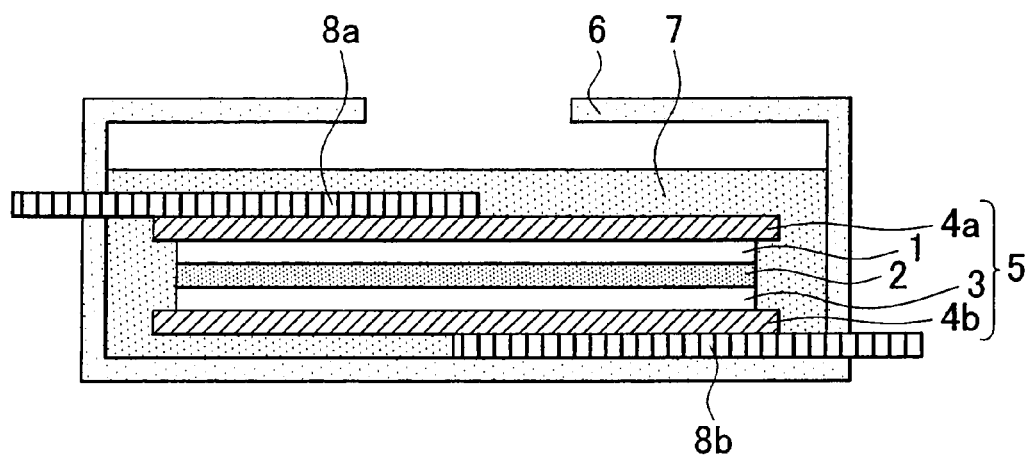
FIG. 1 is a cross-sectional view schematically showing an example solid-state battery of the invention.

In the following, the structure of the solid-state battery of the invention will be described with reference to the drawings. FIG. 1 is a cross-sectional view schematically showing an example of the solid-state battery of the invention. This solid-state battery incorporates a power generation element 5 constituted of a cathode layer 1 containing a cathode active material (e.g., $LiCoO_2$), a sulfide-based solid electrolyte membrane 2 made of, for example, $Li_2S$—$P_2S_5$ glass ceramics, an anode layer 3 made of In foils, and a power collector 4 made of stainless steel (a cathode power collector 4a and an anode power collector 4b). The power generation element 5 is disposed in an open-type battery case 6 having ventilation holes and sealed by a flowable sealant 7 made of liquid paraffin. The electric power of the power generation element 5 is extracted via power extraction terminals 8 (a cathode power extraction terminal 8a and an anode power extraction terminal 8b) connected to the cathode power collector 4a and the anode power collector 4b, respectively.

Figure 2:
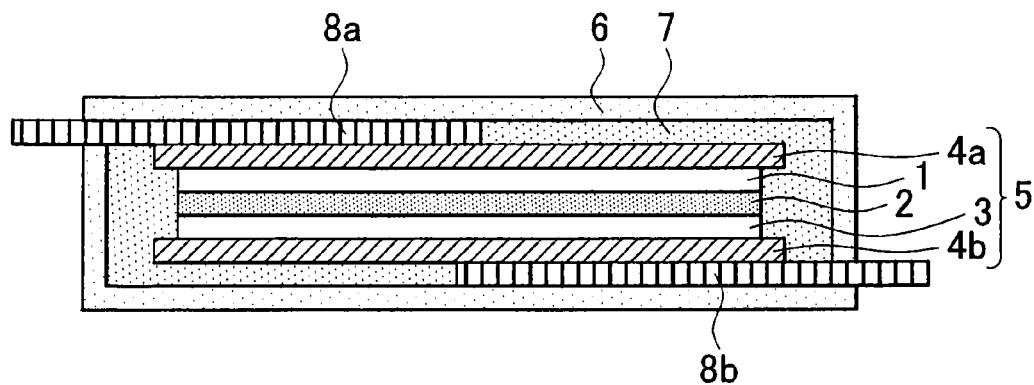
FIG. 2 is a cross-sectional view schematically showing another example solid-state battery of the invention.

FIG. 2 is a cross-sectional view schematically showing another example of the solid-state battery of the invention. Referring to FIG. 2, the battery case 6 may alternatively be a sealed battery case, which is for example a laminate pack battery case made of aluminum. In the following, the components and the structure of the solid-state battery of the invention will be described.

1. First, the components of the solid-state battery of the invention will be described. The solid-state battery of the invention has at least the power generation element, the battery case, and the flowable sealant, and typically has the terminals for extracting the electric power of the power generation element.

(1) First, the flowable sealant used in the solid-state battery of the invention will be described. The flowable sealant used in the solid-state battery of the invention is required to seal the power generation element and to be non-reactive with the sulfide-based solid electrolyte membrane. The phrase "non-reactive with the sulfide-based solid electrolyte membrane" means that the flowable sealant does not cause any reactions with the sulfide-based solid electrolyte membrane which produce hydrogen sulfides, or the like, and therefore does not degrade the function of the sulfide-based solid electrolyte membrane. The word "flowable" means that the sealant is not solid nor gaseous and is flexible or deformable enough to tolerate a change in the volume of the power generation element, which occurs when the power generation element 5 is being charged with electric power or when electric power is being discharged from the power generation element 5. That is, the flowable sealant in the invention includes various dispersions (e.g., sots, gels, emulsions) as well as various liquids (e.g., organic solvents). The flowable sealant in the invention is preferably made of a highly insulative material. In the following, a case where the solid-state battery has an open-type battery case and a case where the solid-state battery has a sealed battery case will be described one by one.

(i) First, a case where the solid-state battery has an open-type battery case will be described with reference to FIG. 1. Referring to FIG. 1, as mentioned above, the flowable sealant is in contact with the ambient air (air), and therefore a flowable sealant having a high hydrophobicity is preferably used. More specifically, a hydrophobic liquid is preferably used as the flowable sealant because it prevents the moisture in air from contacting the sulfide-based solid electrolyte membrane.

In the solid-state battery, it is preferable that the amount of the water contained in the flowable sealant be small, specifically, 100 ppm or smaller, preferably 50 ppm or smaller, more preferably 30 ppm or smaller. That is, if too much water is contained in the flowable sealant, it may accelerate the degradation of the sulfide-based solid electrolyte membrane.

The solubility of the flowable sealant to water (water vapor) is for example 1% (w/w) or lower, preferably 0.5% (w/w) or lower, and more preferably 0.1% (w/w) or lower at 25° C./1 atm. In general, a method is known in which the hydrophobicity of an object is defined using a partition coefficient of a flowable sealant to a water-n-octanol solvent. In the invention, $LogP_{ow}$ of the flowable sealant is preferably 0 or more, preferably 1 or more, and more preferably 2 or more.

The hydrophobic liquid is, for example, chain saturated hydrocarbon, cyclic saturated hydrocarbon, or nonpolar liquid.

The chain saturated hydrocarbon may either have a straight-chain structure or a branch structure as long as it is flowable. Further, the flowable sealant may either be made of single chain saturated hydrocarbon or compound composed of two or more chain saturated hydrocarbons.

The single chain saturated hydrocarbon is, for example, pentane, hexane, heptane, octane, nonane, decane, undecane, or dodecane. The compound consisting of two or more chain saturated hydrocarbons is, for example, liquid paraffin. The liquid paraffin is typically a compound composed of 20 or more chain saturated hydrocarbons and having a property of remaining in a liquid state at a room temperature. In the invention, the hydrophilic liquid is preferably a liquid paraffin.

The above-stated cyclic saturated hydrocarbon is, for example, cycloalkane (e.g., cyclopentane, cyclohexane, cycloheptane, cyclooctane). The nonpolar liquid is, for example, benzene, toluene, diethyl ether, chloroform, ethyl acetate, tetrahydrofura, or methyl chloride. Note that in the invention a dispersion, such as a sol, a gel, and an emulsion may be used as the flowable sealant.

In a case where the battery case is a sealed battery case, as shown in FIG. 2, the flowable sealant basically does not contact the ambient air (air). Therefore, the flowable sealant is not specifically limited as long as it is not reactive with the sulfide-based solid electrolyte membrane. For example, a flowable sealant having a high hydrophobicity is preferably used. More specifically, a hydrophobic liquid is preferably used. This is because even if air is left in the cathode layer, the air can be easily removed and thus the sulfide-based solid electrolyte membrane can be prevented from contacting the moisture contained in the air. Note that the foregoing descriptions regarding the type of hydrophobic liquid, and so on, apply also to this case, and therefore they are not described here again.

(2) Next, the power generation element of the solid-state battery of the invention will be described. The power generation element of the solid-state battery of the invention is constituted of the cathode layer, the sulfide-based solid electrolyte membrane, and the anode layer, which are stacked in this order. Normally, a cathode power collector for collecting electric power from the cathode layer and an anode power collector for collecting electric power from the anode layer are also provided in the solid-state battery.

The solid-state battery of the invention is particularly characterized in the use of the flowable sealant. Therefore, the type of the ion conductors used in the solid-state battery are not particularly limited. However, Li-ions are preferred as the ion conductors. That is, the solid-state battery is preferably a fully solid lithium battery because it has a relatively high energy density. Further, the solid-state battery of the invention may either be a primary battery or a secondary battery. However, a secondary battery is preferred because it is suitable for the use in a vehicle. In the following, the materials of the power generation element, and the like, will be described with reference to a case where the solid-state battery of the invention is a lithium battery.

The sulfide-based solid electrolyte membrane may be any sulfide-based solid electrolyte membrane as long as it contains sulfur components and has an ion-conductivity and a property of reacting with the moisture in the air to produce hydrogen sulfide. The material of the sulfide-based solid electrolyte membrane may be selected, for example, from among those containing Li, S, and a third component A. The third component A may be at least one selected from the group consisting of P, Ge, B, Si, I, Al, Ga, and As. The sulfide-based solid electrolyte membrane may be selected from, for example, among $Li_2S-P_2S_5$, $70Li_2S-30P_2S_5$, $80Li_2S-20P_2S_5$, $Li_2S-SiS_2$, and $LiGe_{0.25}P_{0.75}S_4$. Among these, $Li_2S-P_2S_5$ is especially preferred because it provides a high ion-conductive solid electrolyte membrane.

The sulfide-based solid electrolyte can be produced by, for example, vitrifying a material containing Li, S, and a third component A using a planetary ball mill or by vitrifying said material by melting and quenching it. In order to improve the performance of the sulfide-based solid electrolyte, a heat treatment may be performed in the process of producing the sulfide-based solid electrolyte. The sulfide-based solid electrolyte may be formed into the shape of a membrane using a method in which the sulfide-based solid electrolyte is palletized by uniaxial compression forming, for example. The thickness of the sulfide-based solid electrolyte membrane is not limited to any specific value, but it is preferably within the range of 0.1 to 1000 μm, and more preferably within the range of 0.1 to 300 μm.

The cathode layer of the solid-state battery of the invention may be the same as cathode layers for typical solid-state batteries. The cathode layer contains at least a cathode active material. This cathode active material may be, for example, selected from among $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}Co_{1/3}Mn_{1/3}O_2$. Among these, $LiCoO_2$ is especially preferred. The cathode layer may also contain a conductive agent to boost the conductivity. The conductive agent may be, for example, acetylene black, carbon fibers, or the like.

The thickness of the cathode layer is not limited to any specific value, but it is preferably within the range of 1 to 100 μm. The cathode layer may be formed by, for example, performing compression molding to powders of the cathode active material and other necessary materials. Normally, the cathode layer has a cathode power collector for collecting electric power from the cathode layer. The cathode power collector may be made of, for example, stainless steel and may be formed in the shape of a foil or in a mesh pattern.

The anode layer of the solid-state battery of the invention may be the same as anode layers for typical solid-state batteries. The anode layer has at least an anode active material. The anode active material is, for example, a metal-based active material or a carbon-based active material. The metal-based active material may be selected from, for example, among In, Al, Si, and Sn. Among these, In is especially preferred. The metal-based active material may be an inorganic-oxide-based active material such as $Li_4Ti_5O_{12}$. On the other hand, the carbon-based active material may be selected from, for example, among mesocarbon microbead (MCMB), highly-oriented graphite (HOPG), hard carbon, and soft carbon.

The anode layer used in the solid-state battery of the invention may either be a metal membrane containing a metal-based active material or a membrane formed by performing compression molding to powders of a metal-based active material or powders of a carbon-based active material. More specifically, the metal membrane is, for example, a foil made of the metal-based active material, a foil on which the metal-based active material is plated, or a foil on which the metal-based active material is evaporated. Among the three, the foil made of the metal-based active material is especially preferred. In a case where the anode layer is formed by performing compressing molding to powders of a metal-based active material, a conductive agent may be added to increase the conductivity. The conductive agent is, for example, acetylene black or carbon fibers.

The thickness of the anode layer is not limited to any specific value, but it is preferably within the range of 1 to 100 μm. Normally, the anode layer has an anode power collector for collecting electric power from the anode layer. The anode power collector may be made of, for example, stainless steel and may be formed in the shape of a foil or in a mesh pattern.

(3) Next, the battery case of the solid-state battery of the invention will be described. The battery case contains the power generation element and the flowable sealant. The battery case may either be an open battery case that allows contact between the flowable sealant therein and the ambient air or a sealed battery case that does not allow contact between the flowable sealant therein and the ambient air.

The battery case of the solid-type battery may be any battery case as long as the power generation element and the flowable sealant can be properly contained in the battery case. For example, the battery case may be a laminate pack battery case, a coil-cell battery case, and a battery case for an air battery having ventilation holes. The material of the battery case of the solid-state battery of the invention may be selected from among the materials used for typical battery cases.

(4) In addition to the components and elements described above, normally, the solid-state battery of the invention has power extraction terminals connected to the anode power collector and the cathode power collector, respectively. The power extraction terminals are, for example, foils or leads. Further, as will be described later, the solid-state battery of the invention may have an intermediate power collector(s), an agitation portion, a temperature adjustment portion, a guide portion, and so on.

2. Next, the structure of the solid-state battery of the invention will be described. In the solid-state battery of the invention, the power generation element is disposed in the battery case, and the power generation element is soaked in the flowable sealant. As such, the power generation element is sealed by the flowable sealant, whereby the sulfide-based electrolyte membrane is prevented from contacting the ambient air.

Figure 3:
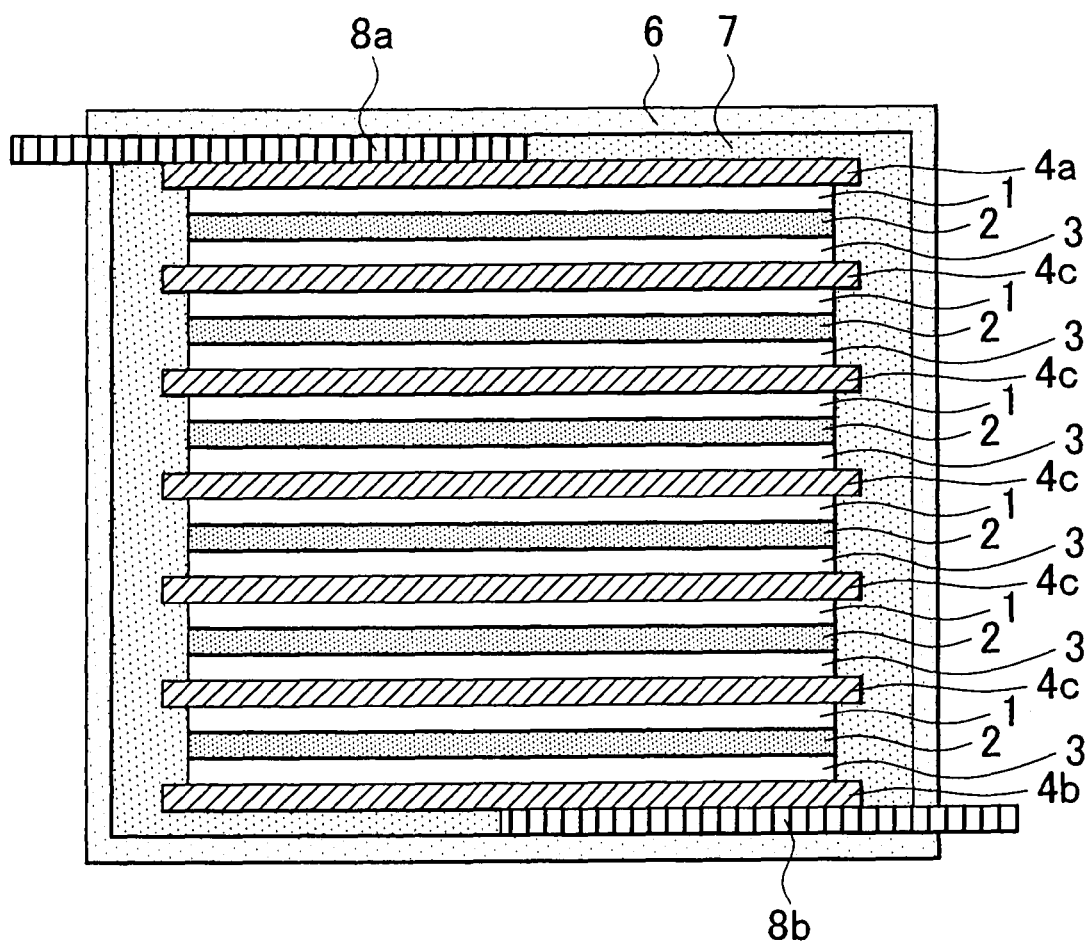
FIG. 3 is a cross-sectional view schematically showing another example solid-state battery of the invention.

In view of the practical use of the solid-state battery of the invention, preferably, it is constituted of two or more power generation elements that are stacked on top of each other with intermediate power collectors interposed in-between. FIG. 3 illustrates one example of such a solid-state battery. Referring to FIG. 3, a solid-state battery incorporates multiple power generation elements each constituted of a cathode layer 1, a sulfide-based solid electrolyte membrane 2, and an anode layer 3, and the power generation elements are stacked on top of each other with intermediate power collectors 4c interposed in-between. The number of the power generation elements stacked in the solid-state battery is 1 or more, preferably 2 or more, more preferably 10 or more, still more preferably 50 or more. However, normally, the number of the power generation elements incorporated in one solid-state battery does not exceed 100.

The battery case of the solid-state battery of the invention is preferably an open battery case. This is because if the battery case of the solid-state battery of the invention is an open battery case, even if the volume of each power generation element changes upon power charge, power discharge, and so on, the internal pressure in the battery case does not change largely. The solid-state battery shown in FIG. 1 is one example of such a solid-state battery. The battery case 6 of this solid-state battery has ventilation holes. In a case where an open battery case is used in the solid-state battery of the invention, an open battery case having ventilation holes having a small diameter is preferably used for the purpose of suppressing volatilization of the flowable sealant. The diameter of each ventilation hole may be any value as long as it is suitable to avoid a large change in the internal pressure of the battery case.

On the other hand, the battery case of the solid-state battery of the invention is preferably a sealed battery case because it can prevent the moisture in air from entering the solid-state battery and can prevent volatilization of the flowable sealant. FIG. 2 shows one example of such a solid-state battery. Referring FIG. 2, the battery case 6 of the solid-state battery is a sealed battery case. In a case where a sealed battery case is used in the solid-state battery of the invention, the solid-state battery preferably has an internal pressure adjustment portion. In this case, even if the volume of each power generation element changes upon power charge, power discharge, and so on, the internal pressure adjustment portion prevents a large change in the internal pressure of the solid-state battery.

Figure 4A:
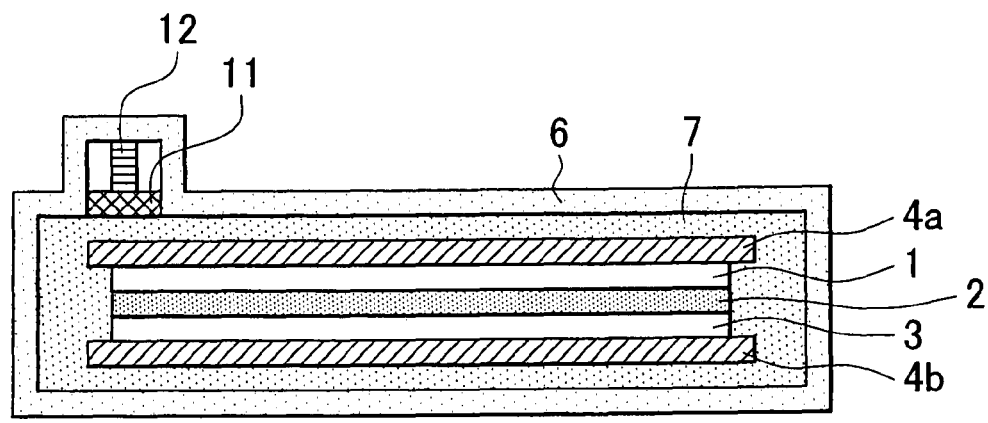
FIG. 4A and FIG. 4B are views each showing an internal pressure adjustment portion incorporated in a solid-state battery according to the invention.
Figure 4B:
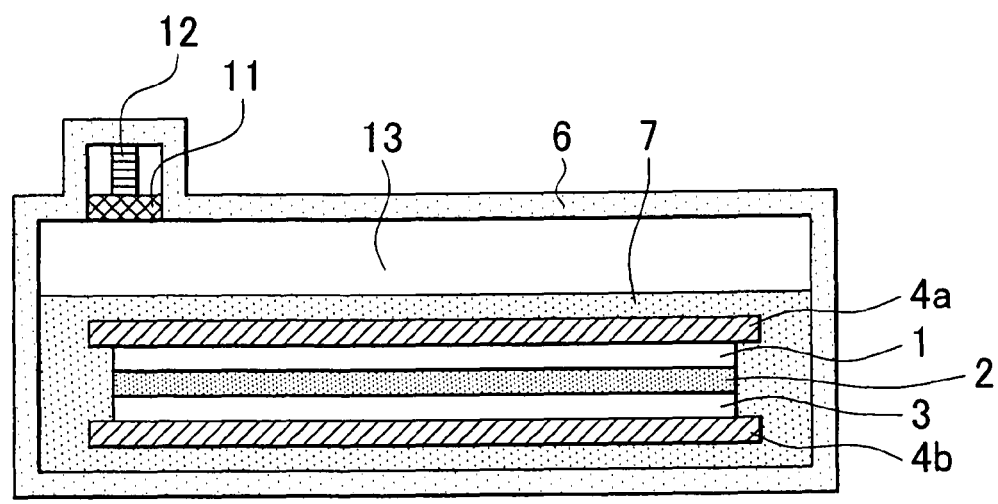

FIG. 4 shows one example structure of the internal pressure adjustment portion. Referring to FIG. 4A, the internal pressure adjustment portion is constituted of a partition plate 11 and a spring 12. According to this structure, when the power generation element expands, a flowable sealant 7 presses the partition plate 11 and thus makes the spring 12 contract, thereby damping the increase in the internal pressure of the solid-state battery. On the other hand, when the power generation element contracts, the spring 12 expands whereby the partition plate 11 presses the flowable sealant 7, thereby damping the decrease in the internal pressure of the solid-state battery. Meanwhile, FIG. 4B illustrates a case where the battery case 6 is a sealed battery case and inactive gas 13 free of moisture is hermetically enclosed in the battery case 6. According to this structure, the internal pressure of the battery case 6 is adjusted by the internal pressure adjustment portion via the inactive gas 13. In this case, because the flowable sealant is not in contact with the internal pressure adjustment portion, contamination of the flowable sealant can be minimized, which is desirable. In another example of the internal pressure adjustment portion, the partition plate and the spring can be replaced by a balloon made of resin, or the battery case may be made of an elastic material.

The solid-state battery of the invention preferably has an agitation portion for agitating the flowable sealant. In this case, for example, when the power generation element is heated or cooled via the flowable sealant, the temperature of the power generation element increases or decreases uniformly. In a case where non-flowable solid resin, or the like, is used as the sealant for sealing the power generation element, if the power generation element is heated or cooled via the sealant, the increase or decrease in the temperature of the power generation element is not uniform. On the other hand, in the solid-state battery of the invention in which an agitation portion is provided, because the flowable sealant is used and further it is agitated by the agitation portion, the temperature of the power generation element can be uniformly adjusted, and therefore the power generation efficiency improves.

Figure 5:
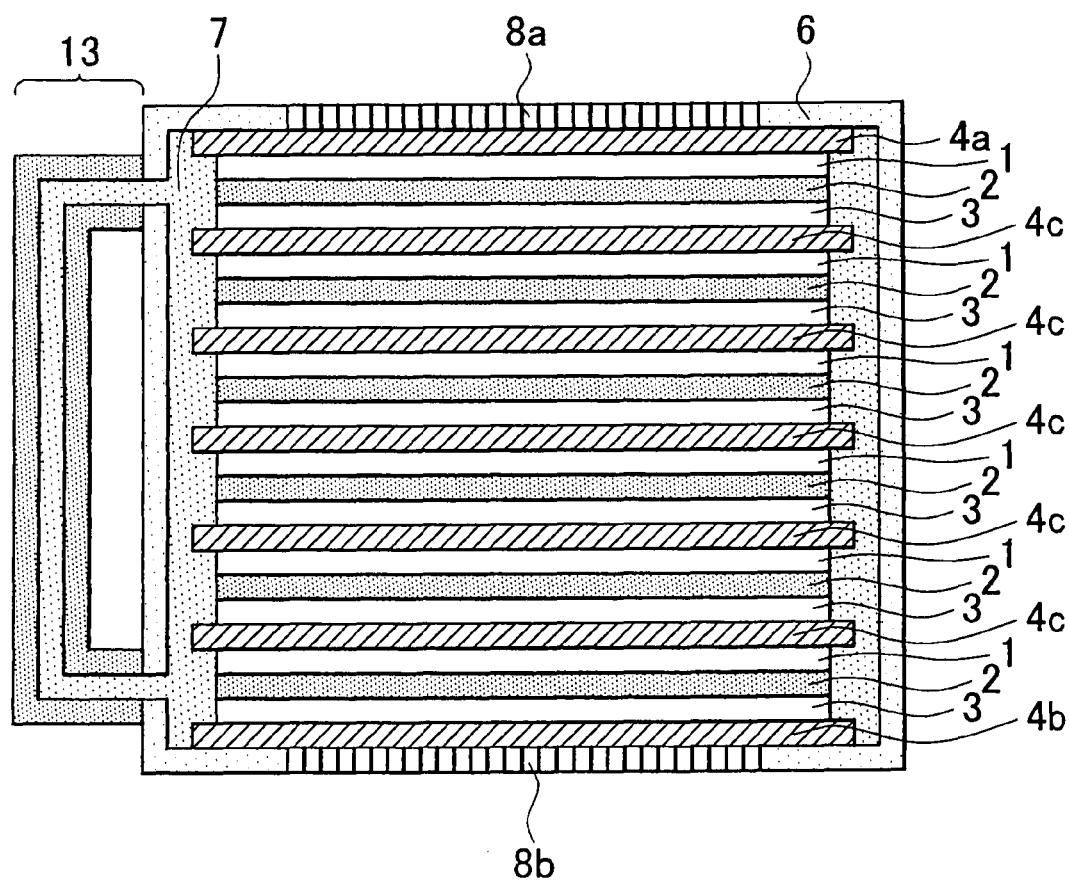
FIG. 5 is a view showing an external passage incorporated in a solid-state battery according to the invention.

The structure of the agitation portion is not limited to any specific structure as long as it can properly agitate the flowable sealant. For example, an external passage may be connected to the battery case so that the flowable sealant is circulated through the external passage. FIG. 5 illustrates one example of such a structure. In the structure illustrated in FIG. 5, the flowable sealant 7 is circulated via an external passage 13 connected to the battery case 6. Further, a liquid circulator (e.g., motor) for circulating the flowable sealant may be provided in the external passage 13. The flowable sealant 7 in the battery case 6 moves upward as heated by the power generation element while the flowable sealant 7 in the external passage 13 moves downward as it is cooled naturally. Therefore, even if any agitation portion for agitating the flowable sealant is not provided, the flowable sealant slowly circulates due to the specific gravity difference. Further, a screw propeller may be provided in the battery case as the agitation portion.

The solid-state battery of the invention preferably has a temperature adjustment portion for heating and/or cooling the flowable sealant. This is because by adjusting the temperature of the power generation element via the flowable sealant, power charge and power discharge of the solid-state battery can be performed under an appropriate thermal condition, and thus the power generation efficiency improves accordingly.

Further, because the flowable sealant directly contacts the power generation element, the temperature of the power generation element can be adjusted efficiently. Meanwhile, various methods may be used to heat and cool the flowable sealant. For example, the flowable sealant may be heated and cooled via the battery case, or the flowable sealant may be heated and cooled by providing a pipe in the battery case and circulating a heating medium or a cooling medium through the pipe, or the flowable sealant may be heated and cooled by circulating the flowable sealant through the external passage stated above. Meanwhile, in a case where the solid-state battery of the invention is mounted in a vehicle, the flowable sealant may be cooled using the radiator of the vehicle. Preferably, the solid-state battery of the intention has the temperature adjustment portion and the agitation portion stated above in order to take full advantage of the flowability of the sealant.

Figure 6:
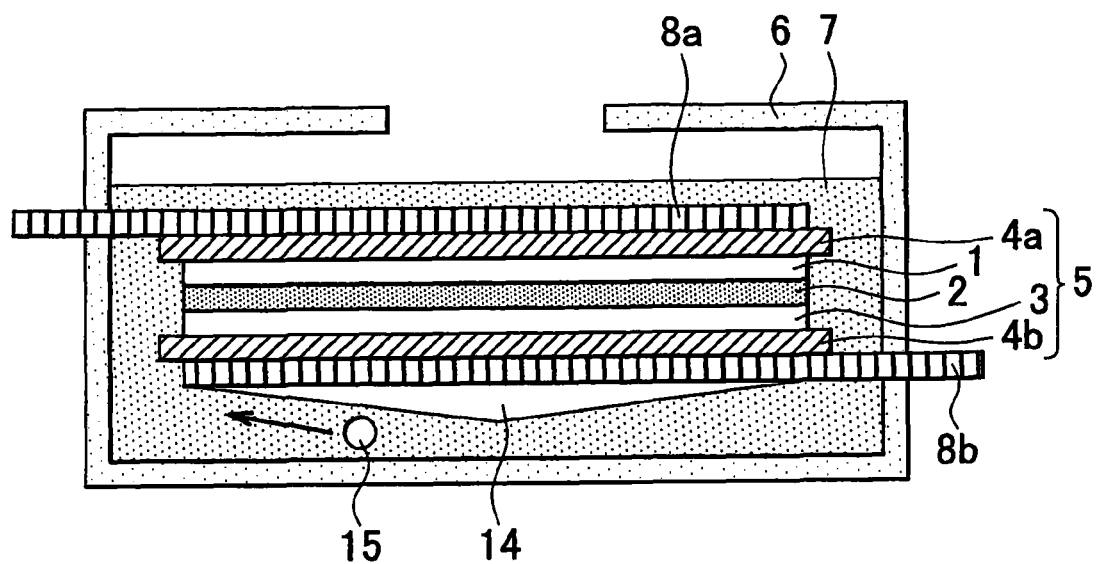
FIG. 6 is a view showing a guide portion incorporated in a solid-state battery according to the invention.

Further, in the solid-state battery of the invention, preferably, a guide portion for guiding bubbles is provided at the bottom side of the battery case. According to this structure, when the power generation element is soaked in the flowable sealant, bubbles do not remain near the bottom side of the battery case. FIG. 6 illustrates one example of a solid-state battery having such a guide portion. Referring to FIG. 6, the power generation element 5 has a guide portion 14 attached on the anode power extraction terminal 8b at the bottom side of the battery case 6. According to this structure, the guide portion 14 prevents bubbles 15 from remaining at the bottom side of the battery case 6. The guide portion 14 may formed in, for example, a triangular shape. Further, the guide portion may be grooves formed in the surface of the power collector or in the surface of the power extraction terminal.

Figure 7:
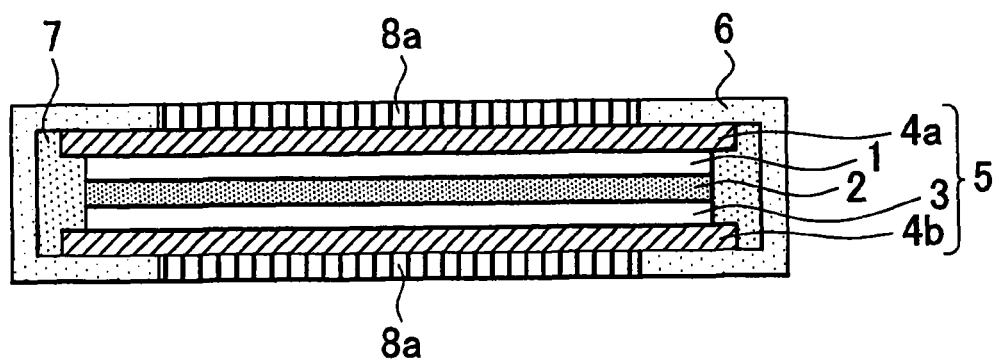
FIG. 7 is a view showing a battery case incorporated in a solid-state battery according to the invention.

The power extraction terminals may be provided as portions of the battery case. In this case, the leak of the flowable sealant can be prevented more reliably. FIG. 7 illustrates one example of the solid-state battery having such a battery case. Referring to FIG. 7, the battery case 6 incorporates the cathode power extraction terminal 8a and the anode power extraction terminal 8b. In the solid-state battery shown in FIG. 2, because the cathode power extraction terminal 8a and the anode power extraction terminal 8b protrude from the battery case 6, even if the portions of the battery case 6 that the cathode power extraction terminal 8a and the anode power extraction terminal 8b penetrate are sealed using a sealer such as resin, there is a possibility that the sealer degrades in time and allows the flowable sealant to leak through said penetrated portions of the battery case 6. On the other hand, in the solid-state battery shown in FIG. 7, because such sealing of the battery case 6 is not necessary, the leak of the flowable sealant can be prevented more reliably.

The solid-state battery of the invention may have a dehydration portion for reducing the amount of water contained in the flowable sealant. The use of such a dehydration portion contributes to further preventing the degradation of the sulfide-based solid electrolyte membrane. The dehydration portion may be accomplished by, for example, providing a dehydration agent in the battery case. The dehydration agent may be any dehydration agent as long as it is water-absorbing and does not adversely affect the flowable sealant. That is, the dehydration agent may be selected from among typical dehydration agents, such as slica gel and molecular sieve.

It is to be noted that the invention is not limited to any of the foregoing example embodiments. That is, the foregoing example embodiments are only exemplary, and the invention is intended to cover any structures and methods that are substantially equivalent to those described in the claims of the invention or that provide effects or advantages substantially equivalent to those obtained with the structures and methods described in the claims of the invention.

Hereinafter, the invention will be described in more detail with reference to an example of the invention.

First Example

A power generation element is produced in an inactive gas atmosphere. First, $LiCoO_2$ was prepared as a cathode active material, and In foils (100 μm in thickness) were prepared as an anode active material. Next, $Li_2S$ (product of Nippon Chemical Industrial) and $P_2S_5$ (product of Aldrich Chemical) were milled using a planetary ball mill, whereby $Li_2S-P_2S_5$, which is sulfide-based solid electrolyte, was obtained. Then, the anode active material (In foils) was put on a pressing machine and pressed at 0.6 t/cm$^2$. Subsequently, the sulfide-based solid electrolyte ($Li^2S-P_2S_5$) was put on the pressed material and then pressed at 1.2 t/cm$^2$. Subsequently, the cathode active material ($LiCoO_2$) was put on the pressed material and then pressed at 5 t/cm$^2$, whereby a laminated body consisting of an anode layer, a sulfide-based solid electrolyte membrane, and a cathode layer is obtained. Then, the laminated body was cramped between power collectors (made of stainless steel, 10 mm in thickness), whereby a power generation element was obtained.

Next, 600 mL of liquid paraffin was poured into a 2-liter desiccator, and the power generation element was entirely soaked in the liquid paraffin, and then the cock of the desiccator was opened to replace the content of the desiccator with the ambient air, and then the cock was closed. As such, a solid-state battery was obtained.

First Comparative Example

A solid-state battery was produced in the same manner as the first example of the invention except that liquid paraffin was not used.

(Evaluation)

Each of the solid-state battery of the first example of the invention and the solid-state battery of the first comparative example was left in the desiccator with the cock closed, and the time dependency of the hydrogen sulfide concentration in the dedicator was observed. Gas Buster Light GBL-HS (Product of As-One) was used to measure the hydrogen sulfide concentration. The measurement was conducted 10 minutes, 1 day, 2 days, and 10 days after the content of the desiccator was replaced with the ambient air. Table 1 shows the results of the measurements.

TABLE 1

|  | 10 min | 1 day | 2 days | 10 days |
|---|---|---|---|---|
| FIRST EXAMPLE | 0 ppm | 0 ppm | 0 ppm | 0 ppm |
| FIRST COMPARATIVE EXAMPLE | 19 ppm | 31 ppm | 63 ppm | — |

As indicated in Table 1, in the case of the solid-state battery of the first example of the invention, no hydrogen sulfide was detected even 10 days later. On the other hand, in the case of the solid-state battery of the first comparative example, hydrogen sulfide was detected immediately after the content of the desiccator was replaced with the ambient air.

Figure 8:
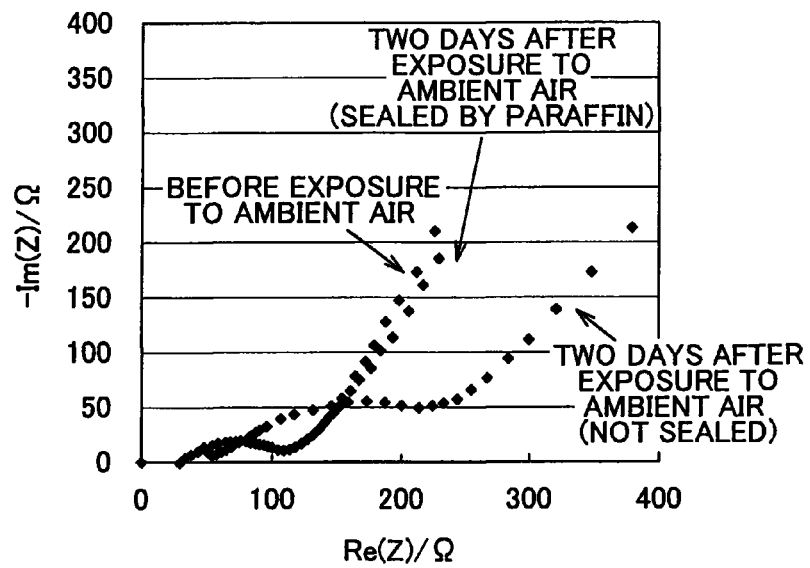
FIG. 8 is a graph illustrating the measured AC impedances of the solid-state battery of the first example of the invention and the solid-state battery of the first comparative example.

(2) The variation of the internal resistance of each of the solid-state battery of the first example of the invention and the solid-state battery of the first comparative example was observed. The internal resistance was measured using the AC-impedance method under the following conditions: the frequency range was 10 MHz to 0.1 Hz; the voltage amplitude was 5 mV: and the used measurement device was Impedance Analyzer 1260 of Solartron. The internal resistance of each solid-state battery was measured before the content of the desiccator was replaced with the ambient air (initial internal resistance) and two days later from said replacement (resistance two days later from exposure to the ambient air). FIG. 8 and Table 2 show the results of the measurements.

TABLE 2

|  | INITIAL INTERNAL RESISTANCE (Ω) | RESISTANCE TWO DAYS LATER FROM EXPOSURE TO THE AMBIENT AIR (Ω) |
|---|---|---|
| FIRST EXAMPLE | 119 | 119 |
| FIRST COMPARATIVE EXAMPLE | 130 | 281 |

As indicated in Table 2, in the case of the solid-state battery of the first example of the invention, the initial internal resistance and the internal resistance two days after the exposure to the ambient were equal to each other, showing that the solid-state battery of the first example of the invention had not degraded in time. On the other hand, in the case of the solid-state battery of the first comparative example, the internal resistance had largely increased. This is considered to have been caused by degradation of the sulfide-based solid electrolyte membrane due to the moisture in the air.

Figure 9:
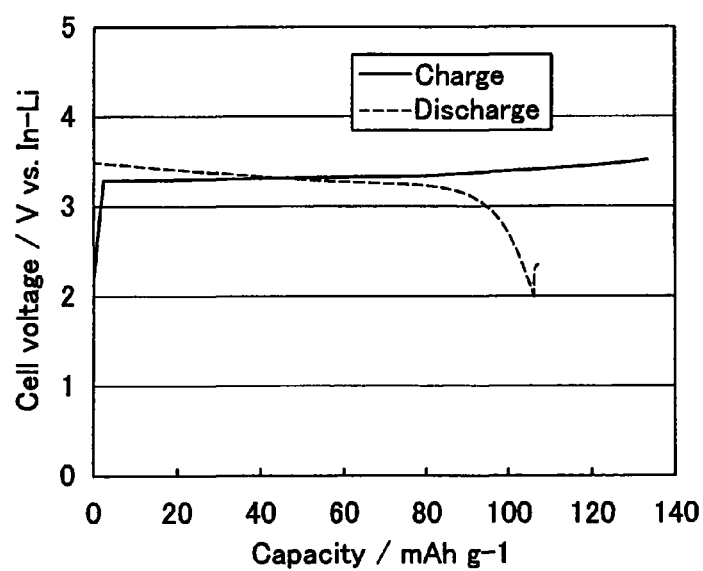
FIG. 9 is a graph illustrating the results of the measured charge-discharge capacity of the solid-state battery of the first example of the invention.

(3) The change-discharge capacity of the solid-state battery of the first example of the invention was measured at a current density of 127 μA/cm2. During the measurement, the solid-state battery was charged up to 3.59 V and then discharged at 2 V. FIG. 9 shows the results of this measurement. As indicated in FIG. 9, it was confirmed that the charge-discharge capacity of the solid-state battery of the first example of the invention was 100 mAh/g or greater with $LiCoO_2$, making it clear that the solid-state battery of the first example of the invention properly functions as a secondary battery even when it is soaked in the flowable sealant (liquid paraffin).

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A solid-state battery comprising:
    a power generation element having a cathode layer, a sulfide-based solid electrolyte membrane, an anode layer that are stacked in this order;
    a battery case in which the power generation element is disposed; and
    a flowable sealant provided in the battery case and being non-reactive with the sulfide-based solid electrolyte membrane, the flowable sealant directly contacts the power generation element, the flowable sealant is a hydrophobic liquid and the hydrophobic liquid is a liquid paraffin.

2. The solid-state battery according to claim 1, wherein the flowable sealant is a dispersion.

3. The solid-state battery according to claim 1, wherein the flowable sealant is insulative.

4. The solid-state battery according to claim 1, wherein the power generation element is provided in plurality, and the power generation elements are stacked with intermediate power collectors interposed in-between.

5. The solid-state battery according to claim 1, wherein the battery case is an open battery case.

6. The solid-state battery according to claim 1, wherein the battery case is a sealed battery case.

7. The solid-state battery according to claim 6, further comprising an internal pressure adjustment portion that adjusts a change in an internal pressure of the solid-state battery that occurs in response to a change in a volume of the power generation element.

8. The solid-state battery according to claim 1, further comprising an agitation portion that agitates the flowable sealant.

9. The solid-state battery according to claim 8, wherein the agitation portion is adapted to circulate the flowable sealant through an external passage connected to the battery case.

10. The solid-state battery according to claim 1, further comprising a temperature adjustment portion that heats or cools the flowable sealant.

11. The solid-state battery according to claim 1, wherein the power generation element has a guide portion that is provided at a bottom side of the battery case so as to release bubbles.

12. The solid-state battery according to claim 1, further comprising a dehydration portion that reduces the amount of water contained in the flowable sealant.

13. A solid-state battery comprising:
a power generation element having a cathode layer, a sulfide-based solid electrolyte membrane, an anode layer that are stacked in this order;
a sealed battery case in which the power generation element is disposed;
a flowable sealant provided in the battery case and being non-reactive with the sulfide-based solid electrolyte membrane, the flowable sealant directly contacts the power generation element; and
at least one of an internal pressure adjustment portion that adjusts a change in an internal pressure of the solid-state battery that occurs in response to a change in a volume of the power generation element, an agitation portion that agitates the flowable sealant, a temperature adjustment portion that heats or cools the flowable sealant, and a dehydration portion that reduces the amount of water contained in the flowable sealant.

14. The solid-state battery according to claim 13, wherein the agitation portion is adapted to circulate the flowable sealant through an external passage connected to the battery case.

15. A solid-state battery comprising:
a power generation element having a cathode layer, a sulfide-based solid electrolyte membrane, an anode layer that are stacked in this order;
a sealed battery case in which the power generation element is disposed; and
a flowable sealant provided in the battery case and being non-reactive with the sulfide-based solid electrolyte membrane, the flowable sealant directly contacts the power generation element;
wherein the power generation element has a guide portion that is provided at a bottom side of the battery case so as to release bubbles.

* * * * *